US011084585B2

(12) United States Patent
Jolley et al.

(10) Patent No.: US 11,084,585 B2
(45) Date of Patent: Aug. 10, 2021

(54) LIGHTED ASSIST HANDLE AND COAT HOOK

(71) Applicant: B/E Aerospace, Inc., Winston-Salem, NC (US)

(72) Inventors: Richard H. Jolley, Addington (GB); Hsin-I Tsai, Newport Pagnell (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 17 days.

(21) Appl. No.: 16/555,341

(22) Filed: Aug. 29, 2019

(65) Prior Publication Data
US 2021/0061469 A1 Mar. 4, 2021

(51) Int. Cl.
| *B64D 11/00* | (2006.01) |
| *B60N 3/02* | (2006.01) |
| *B60R 7/10* | (2006.01) |

(52) U.S. Cl.
CPC .............. *B64D 11/003* (2013.01); *B60N 3/02* (2013.01); *B60R 7/10* (2013.01); *B64D 2203/00* (2013.01)

(58) Field of Classification Search
CPC .... B64D 11/003; B64D 2203/00; B60N 3/02; B60R 7/10
See application file for complete search history.

(56) References Cited

U.S. PATENT DOCUMENTS

| 4,686,609 | A | 8/1987 | Dykstra et al. | |
| 6,397,435 | B1* | 6/2002 | Gosselet | B60N 3/023 |
| | | | | 16/438 |
| 9,751,459 | B1* | 9/2017 | Lenz, Jr. | B60Q 1/2657 |
| 2013/0301289 | A1 | 11/2013 | Durkin et al. | |
| 2015/0069891 | A1* | 3/2015 | Schimanowski | B64D 11/0023 |
| | | | | 312/242 |
| 2017/0050573 | A1 | 2/2017 | Huelke | |
| 2018/0099610 | A1* | 4/2018 | Meyers | B60N 3/02 |
| 2019/0217776 | A1* | 7/2019 | Sato | B60N 3/02 |

FOREIGN PATENT DOCUMENTS

| CA | 2511073 A1 * | 12/2006 | ............... B60Q 3/64 |
| EP | 3786062 A1 | 3/2021 | |
| FR | 3005290 A1 * | 11/2014 | ............... B60N 3/02 |
| KR | 20110054457 A * | 5/2011 | |

OTHER PUBLICATIONS

Search Report for European Application No. 19216023.2 dated Mar. 3, 2021, 2 pages.

* cited by examiner

*Primary Examiner* — Mary Ellen Bowman
(74) *Attorney, Agent, or Firm* — Suiter Swantz pc llo (57) ABSTRACT

An illuminated handle mounted to a surface of a crew work area includes an illuminated portion is disposed on an interior surface. A structural portion is integrated into work area stowage compartments, disposed between two stowage compartments, such that the illuminated portion illuminates the stowage compartments and their contents when opened. The illuminated handle includes an illuminated coat hook protrusion extending from a top portion of the illuminated handle. The illuminated portion of the illuminated coat hook is disposed on an interior surface to further illuminate the stowage compartments and indicate the location of the illuminated coat hook, while the hook extension prevents the illuminated portion from directly illuminating a crew member's face and potentially blinding the crew member momentarily.

18 Claims, 15 Drawing Sheets

LIGHTED ASSIST HANDLE AND COAT HOOK

BACKGROUND

Aircraft, especially crew work areas of aircraft, are space constrained. All of the available space is generally highly utilized with little free space. Furthermore, the work areas are busy and utilitarian. There are few available features that work as stabilizing hand holds, few features for temporarily storing coats, and few features for illuminating the work areas apart from cabin lights which are often dimmed during flight.

SUMMARY

In one aspect, embodiments of the inventive concepts disclosed herein are directed to an illuminated handle mounted to a surface of a crew work area. The illuminated portion is disposed on an interior surface of the illuminated handle. A portion of the illuminated handle is comprised of single piece milled aluminium structure integrated into work area stowage compartments, disposed between two stowage compartments, such that the illuminated portion illuminated the stowage compartments and their contents when opened.

In a further aspect, the illuminated handle includes an illuminated coat hook protrusion extending from a top portion of the illuminated handle. The illuminated portion of the illuminated coat hook is disposed on an interior surface to further illuminate the stowage compartments and indicate the location of the illuminated coat hook, while the hook extension of the milled aluminium structure prevents the illuminated portion from directly illuminating a crew member's face and potentially blinding the crew member momentarily.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an illuminated handle mounted to a surface of a crew work area. The illuminated portion is disposed on an interior surface of the illuminated handle. A portion of the illuminated handle is comprised of single piece milled aluminium structure integrated into work area stowage compartments, disposed between two stowage compartments, such that the illuminated portion illuminated the stowage compartments and their contents when opened.

Figure 1:
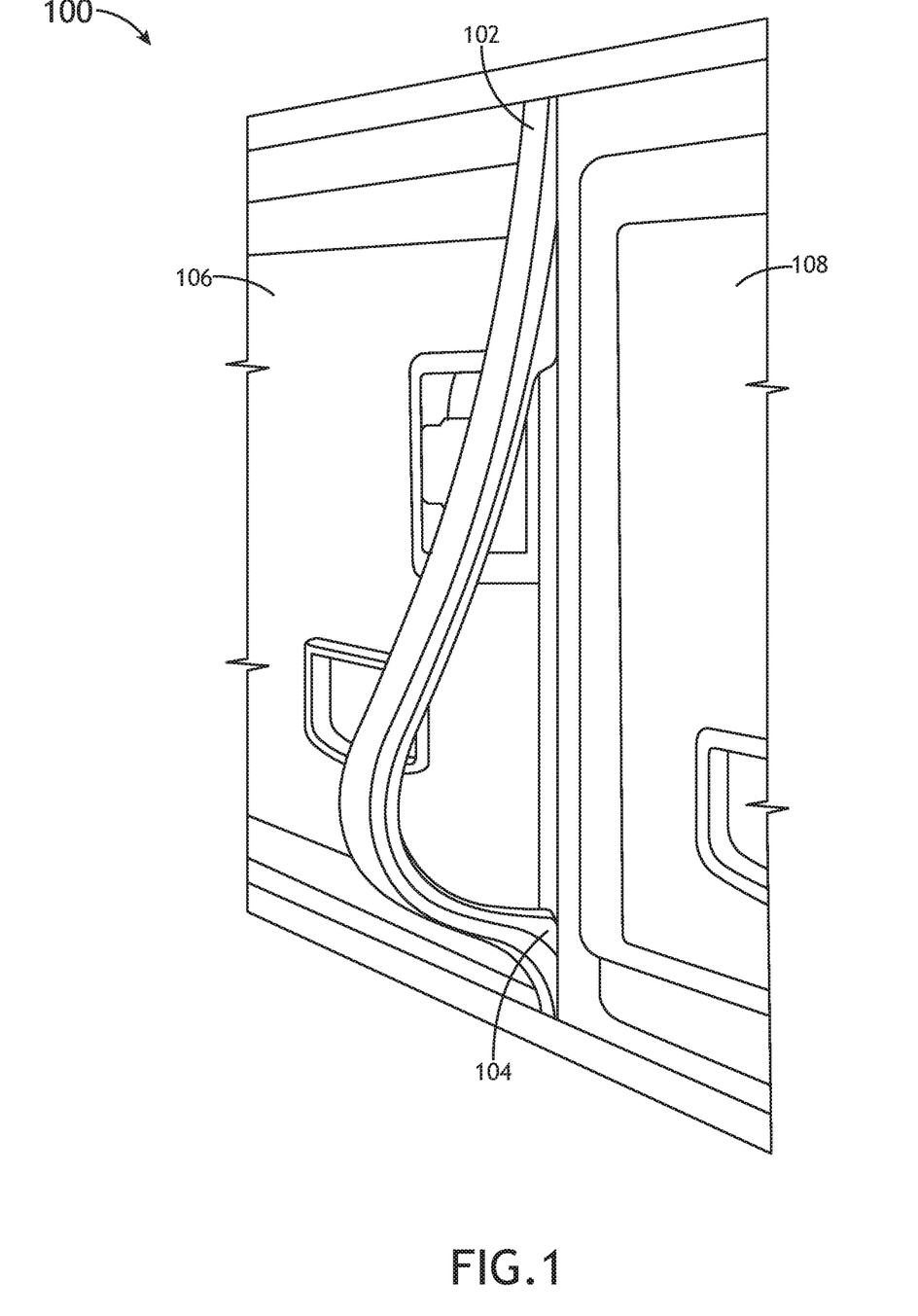
FIG. 1 shows a perspective environmental view of an exemplary embodiment of an illuminated handle.

Referring to FIG. 1, a perspective environmental view of an exemplary embodiment of an illuminated handle 100 is shown. The illuminated handle 100 includes a structural portion 102 and a light-emitting diode (LED) housing portion 104. The structural portion 102 may comprise a milled, stamped, or extruded element with structural characteristics sufficient to satisfy relevant Federal Aviation Administration requirements for passenger and crew area hand holds.

In at least one embodiment, the LED housing 104 comprises a translucent cover to diffuse light from internal LEDs. The LED housing 104 is disposed on an interior surface of the structural portion 102, oriented to illuminate a corresponding section of stowage compartments 106, 108.

Figure 2:
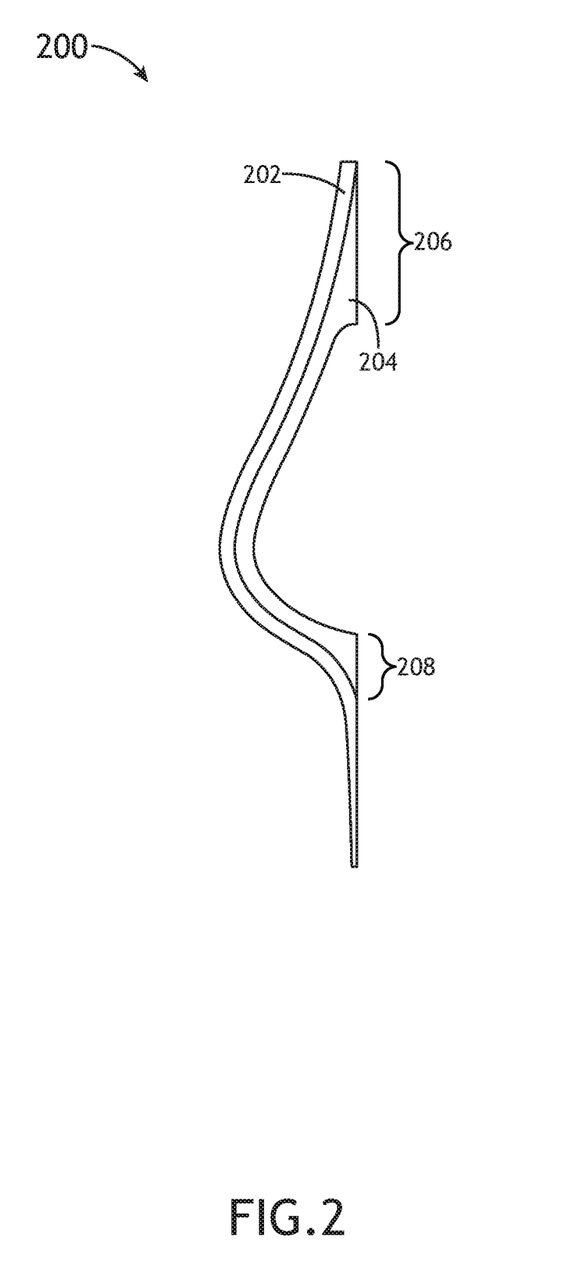
FIG. 2 shows a side view of an exemplary embodiment of an illuminated handle.
Figure 3:
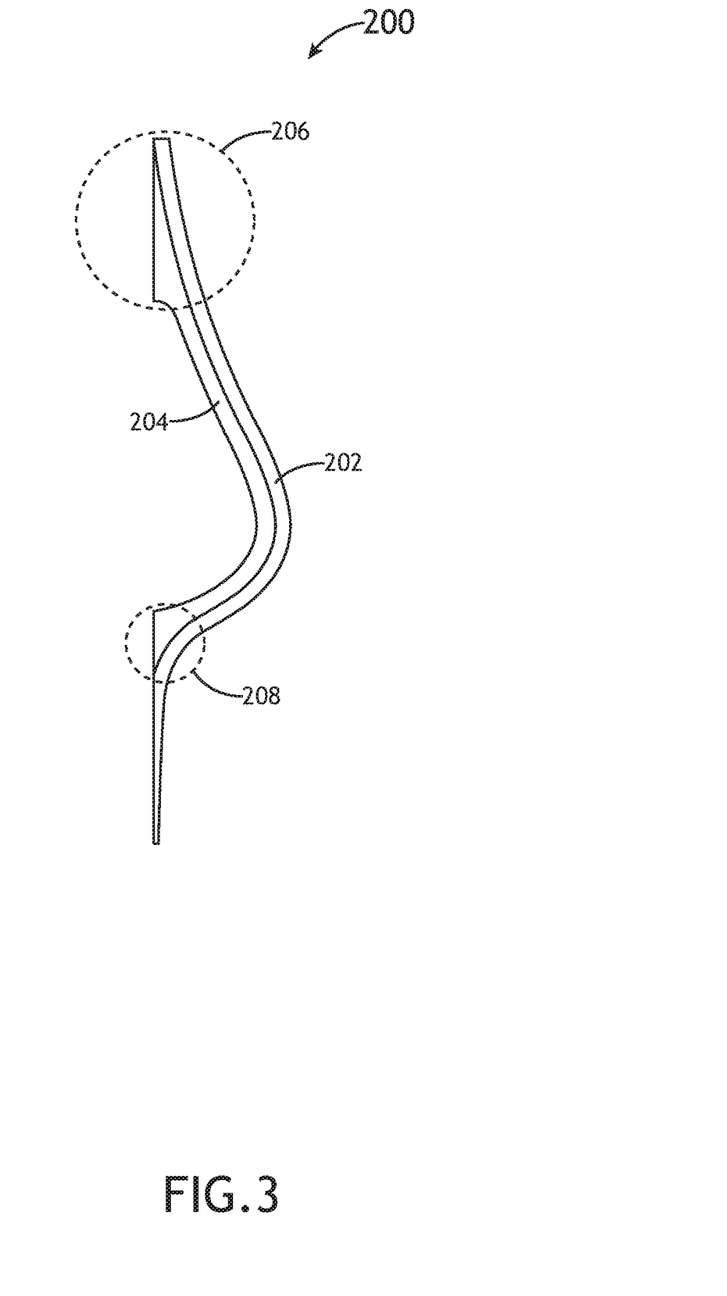
FIG. 3 shows a side view of an exemplary embodiment of an illuminated handle.

Referring to FIGS. 2 and 3, side views of an exemplary embodiment of an illuminated handle 200 are shown. The illuminated handle 200 includes a structural portion 202 having a generally constant cross-sectional thickness. The structural portion 202 may comprise a smooth, continuous profile that avoids sharp angles that may concentrate forces within the structural portion 202 resulting in fatigue or other material failure.

In at least one embodiment, the illuminated handle 200 includes an LED housing 204 that generally conforms to the shape of the structural portion 202 except at a top portion 206 and bottom portion 206. At the top portion 206, a proximal surface of the LED housing 204 conforms to an interior surface of the structural portion 202 while a distal surface abuts a stowage compartment surface or surface of a stowage compartment divider element such that the top portion 206 has a variable cross-sectional thickness and terminates substantially perpendicular to the stowage compartment surface.

Likewise, at the bottom portion 208, a proximal surface of the LED housing 204 conforms to an interior surface of the structural portion 202 while a distal surface abuts a stowage compartment surface or surface of a stowage compartment divider element such that the bottom portion 208 has a variable cross-sectional thickness and terminates substantially perpendicular to the stowage compartment surface.

Figure 4:
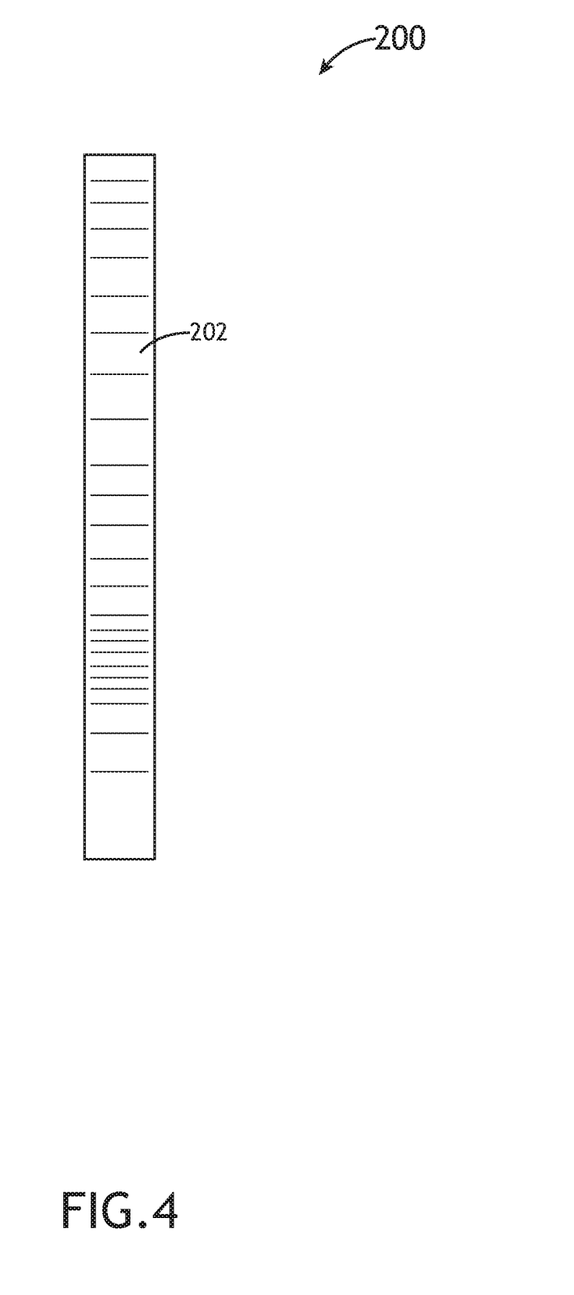
FIG. 4 shows a front view of an exemplary embodiment of an illuminated handle.

Referring to FIG. 4, a front view of an exemplary embodiment of an illuminated handle 200 is shown. The structural portion 202 of the illuminated handle 200 has a generally constant width.

Figure 5:
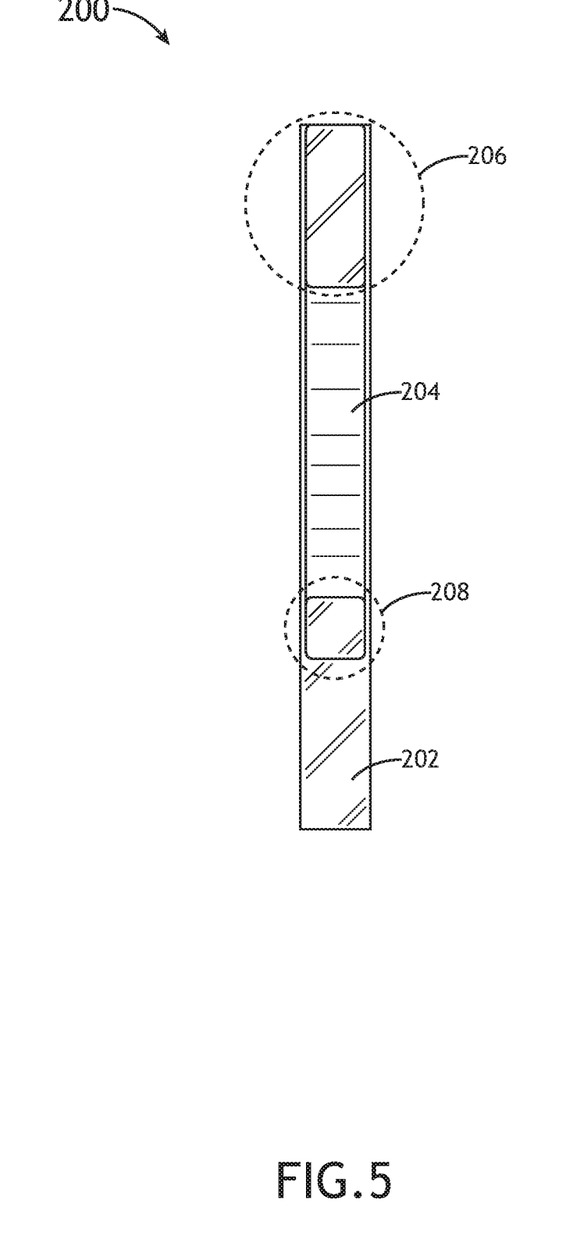
FIG. 5 shows a rear view of an exemplary embodiment of an illuminated handle.

Referring to FIG. 5, a rear view of an exemplary embodiment of an illuminated handle 200 is shown. The structural portion 202 and LED housing 204 each have a generally constant width, but the LED housing 204 is narrower than the structural portion 202. A narrower width of the LED housing 204 may restrict the field of illumination to prevent the illuminated handle 200 from inadvertently, temporarily blinding a crew member.

Figure 6:
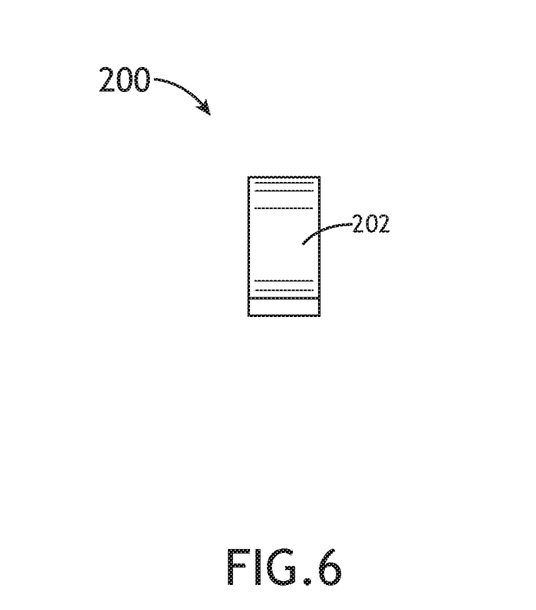
FIG. 6 shows a top view of an exemplary embodiment of an illuminated handle.
Figure 7:
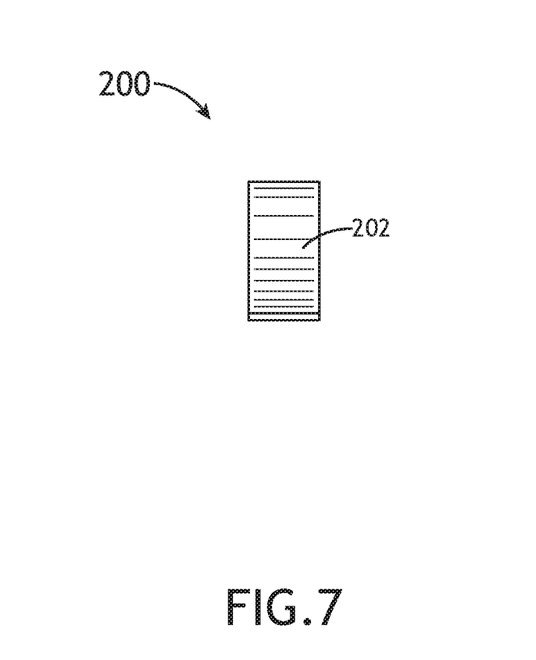
FIG. 7 shows a bottom view of an exemplary embodiment of an illuminated handle.

Referring to FIGS. 6 and 7, a top view and bottom view of an exemplary embodiment of an illuminated handle are shown.

Figure 8:
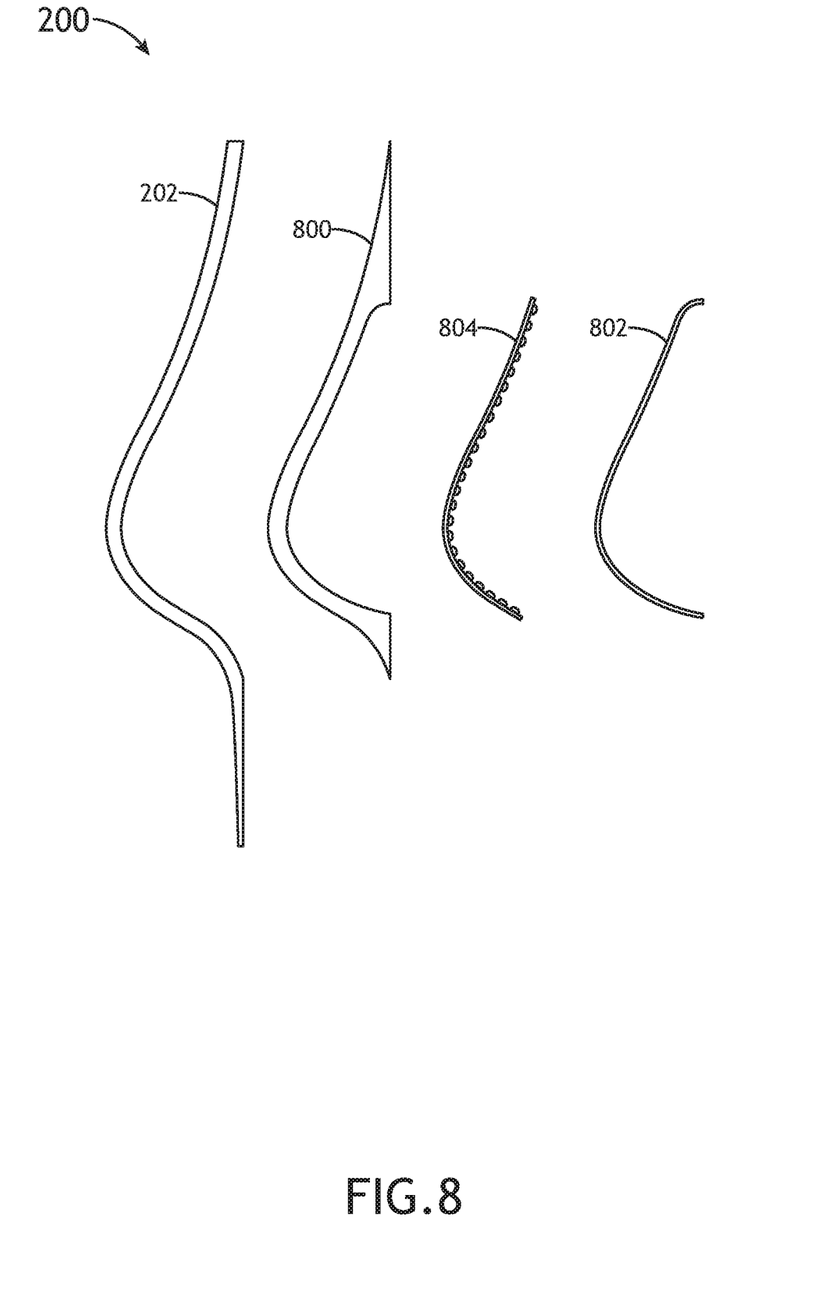
FIG. 8 shows an exploded view of an exemplary embodiment of an illuminated handle.

Referring to FIG. 8, an exploded view of an exemplary embodiment of an illuminated handle 200 is shown. The illuminated handle 200 includes a structural portion 202 and an illumination portion. In at least one embodiment, the illuminated portion comprises an inner housing 800, an outer housing 802, and an LED component 804. The inner housing 800 generally conforms to the shape and size of the structural portion 202, and defines an opening to allow a user to grip the structural portion 202. The outer housing 802 allows access to the interior of the inner housing 800 for installation and maintenance. In at least one embodiment, the outer housing 802 may comprise a plate that snaps over an opening in the inner housing 800.

In at least one embodiment, the LED component 804 comprises an LED strip configured to adhere to an interior surface of the structural portion 202. Alternatively, or in addition, the LED component 804 may comprise one or more individual LEDs disposed at top and bottom portions of the inner housing 800.

The LED component 804 is connected to a power supply which may be a switch to activate the LED component 804; for example, when cabin lights are dimmed or when a nearby stowage compartment is opened.

Figure 9:
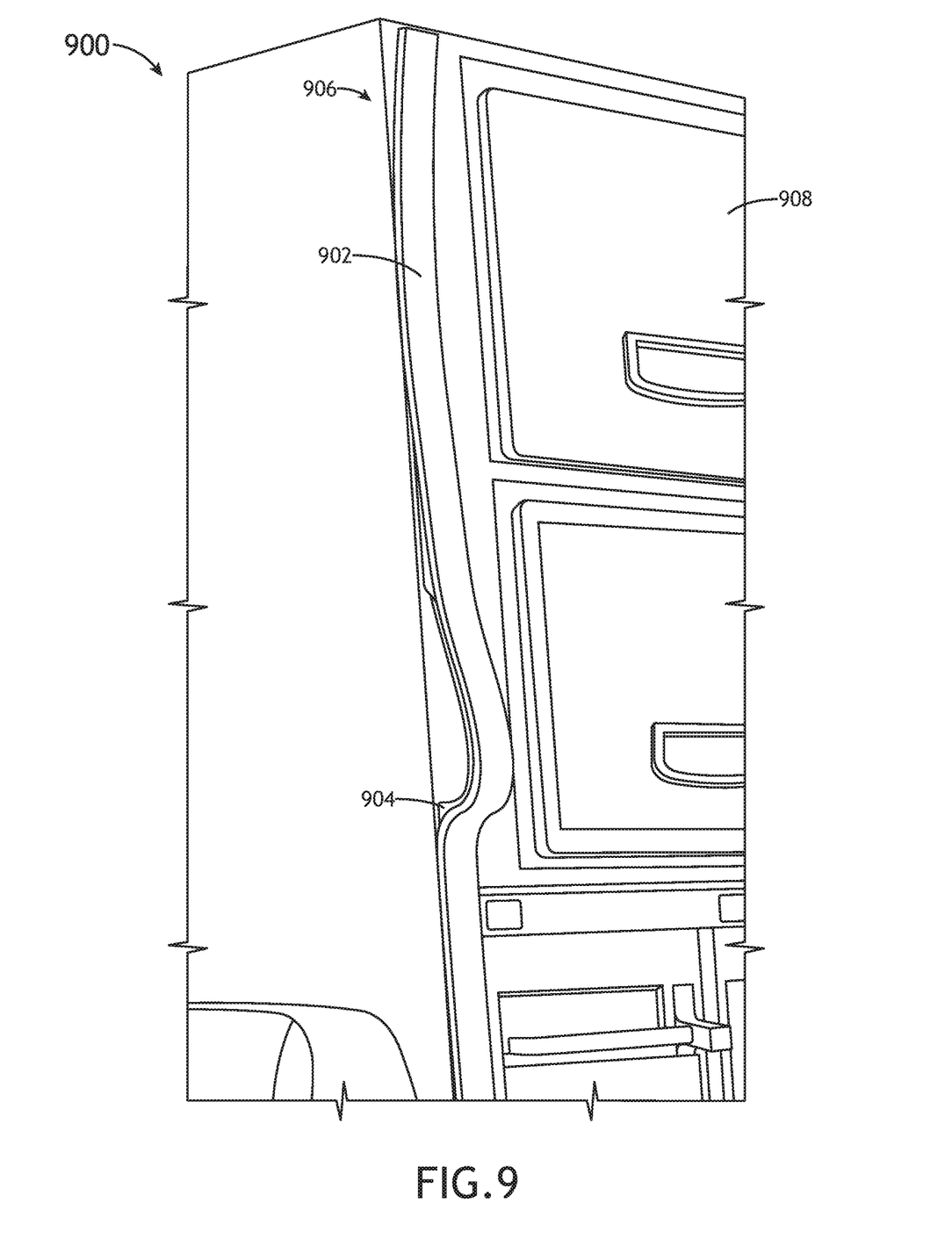
FIG. 9 shows a perspective environmental view of an exemplary embodiment of a combined illuminated handle and coat hook.

Referring to FIG. 9, a perspective environmental view of an exemplary embodiment of a combined illuminated handle and coat hook 900 is shown. The illuminated handle and coat hook 900 includes a structural portion 902, an LED housing handle portion 904, and an LED housing hook portion 906. The structural portion 902 may comprise a milled, stamped, or extruded element with structural characteristics sufficient to satisfy relevant Federal Aviation Administration requirements for passenger and crew area hand holds.

In at least one embodiment, the LED handle housing 904 and LED hook housing 906 each comprises a translucent cover to diffuse light from internal LEDs. The LED housings 904, 906 are disposed on an interior surface of the structural portion 902, oriented to illuminate a corresponding section of stowage compartments 908.

Figure 10:
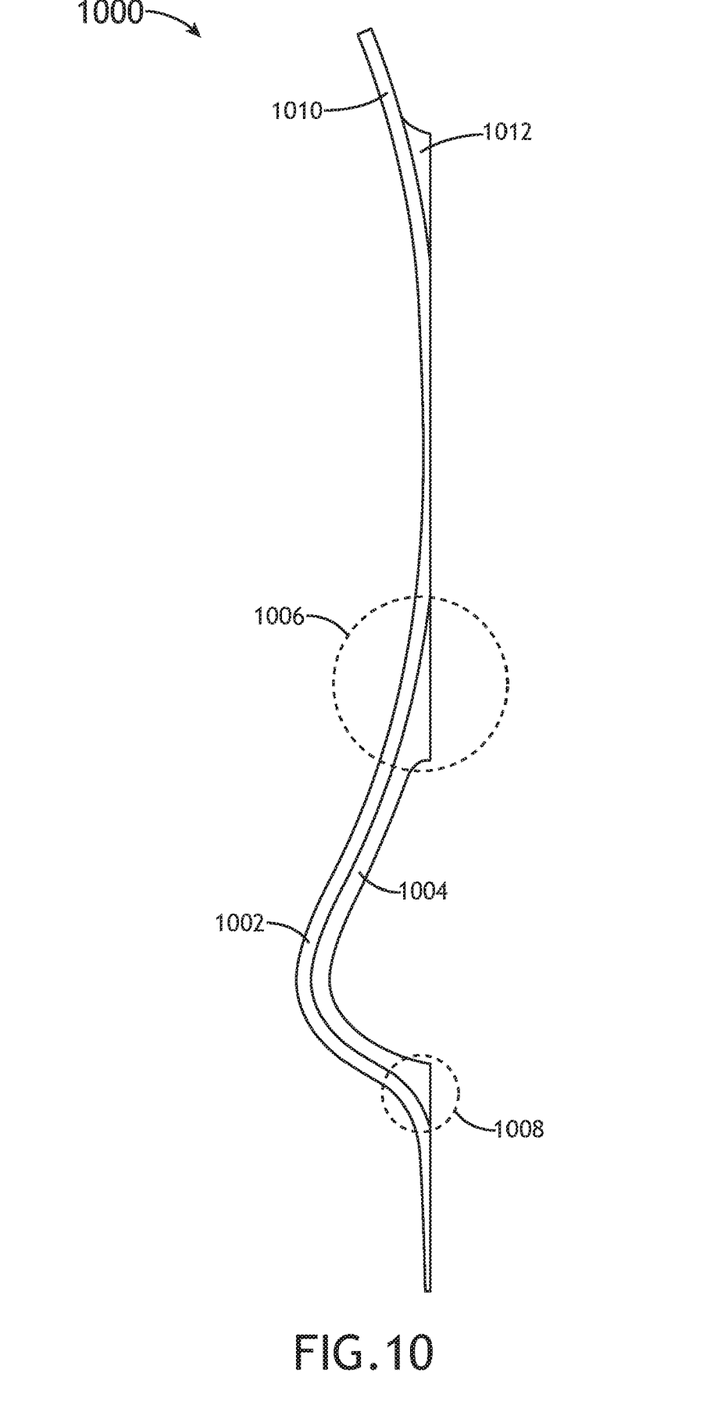
FIG. 10 shows a side view of an exemplary embodiment of a combined illuminated handle and coat hook.
Figure 11:
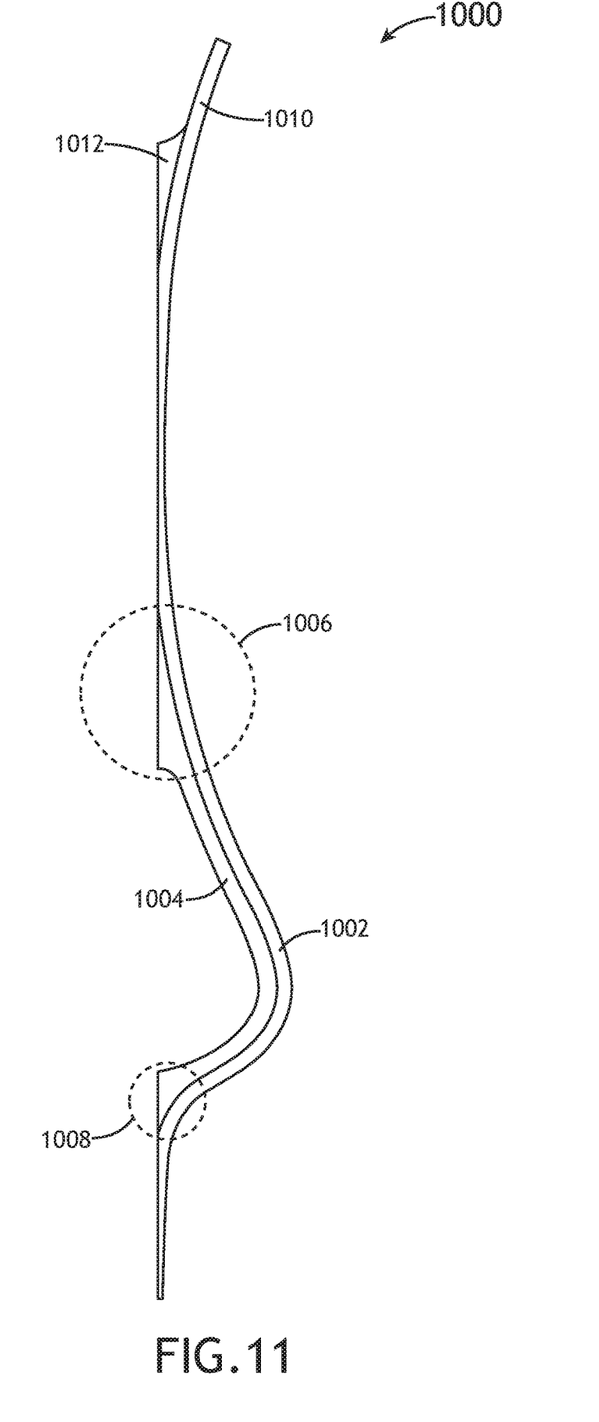
FIG. 11 shows a side view of an exemplary embodiment of a combined illuminated handle and coat hook.

Referring to FIGS. 10 and 11, side views of an exemplary embodiment of a combined illuminated handle and coat hook 1000 are shown. The illuminated handle and coat hook 1000 includes a structural portion 1002 that defines a handle portion and a hook portion 1010. The structural portion 1002 may comprise a smooth, continuous profile that avoids sharp angles that may concentrate forces within the structural portion 1002 resulting in fatigue or other material failure.

In at least one embodiment, the illuminated handle and coat hook 1000 includes an LED handle housing 1004 that generally conforms to the shape of the structural portion 1002 at the handle portion except at a top portion 1006 and bottom portion 1006. At the top portion 1006, a proximal surface of the LED handle housing 1004 conforms to an interior surface of the structural portion 1002 while a distal surface abuts a stowage compartment surface or surface of a stowage compartment divider element such that the top portion 1006 has a variable cross-sectional thickness and terminates substantially perpendicular to the stowage compartment surface.

Likewise, at the bottom portion 1008, a proximal surface of the LED housing 1004 conforms to an interior surface of the structural portion 1002 while a distal surface abuts a stowage compartment surface or surface of a stowage compartment divider element such that the bottom portion 1008 has a variable cross-sectional thickness and terminates substantially perpendicular to the stowage compartment surface.

An LED hook housing 1012 is disposed on an interior surface of the structural portion at the hook portion 1010. The hook portion extends beyond the LED hook housing 1012 to form an illuminated coat hook portion.

Figure 12:
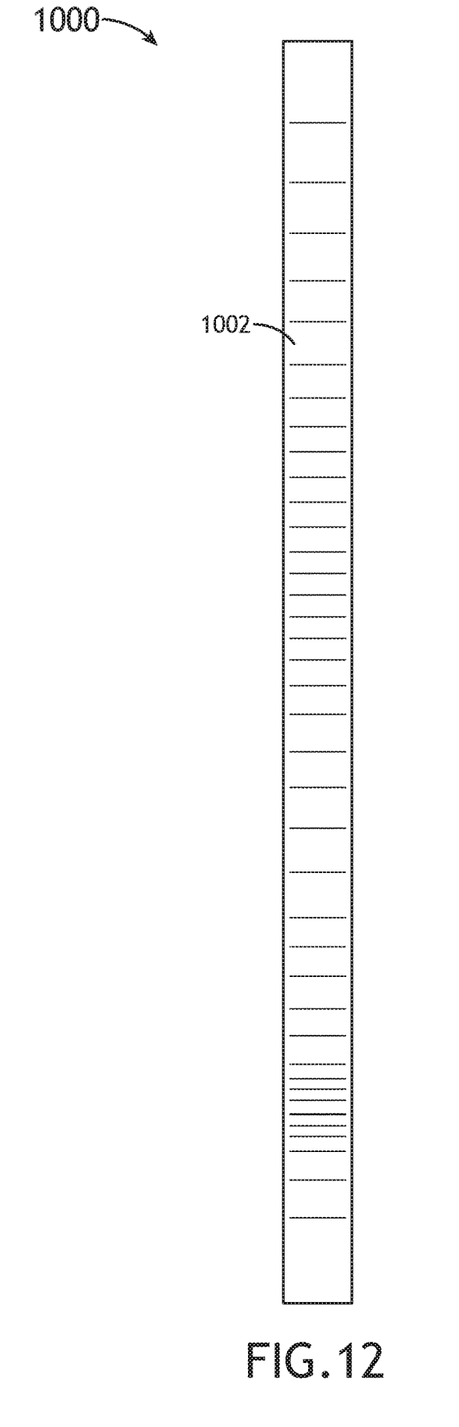
FIG. 12 shows a front view of an exemplary embodiment of a combined illuminated handle and coat hook.

Referring to FIG. 12, a front view of an exemplary embodiment of a combined illuminated handle and coat hook 1000 is shown. The structural portion 1002 of the illuminated handle and coat hook 1000 has a generally constant width.

Figure 13:
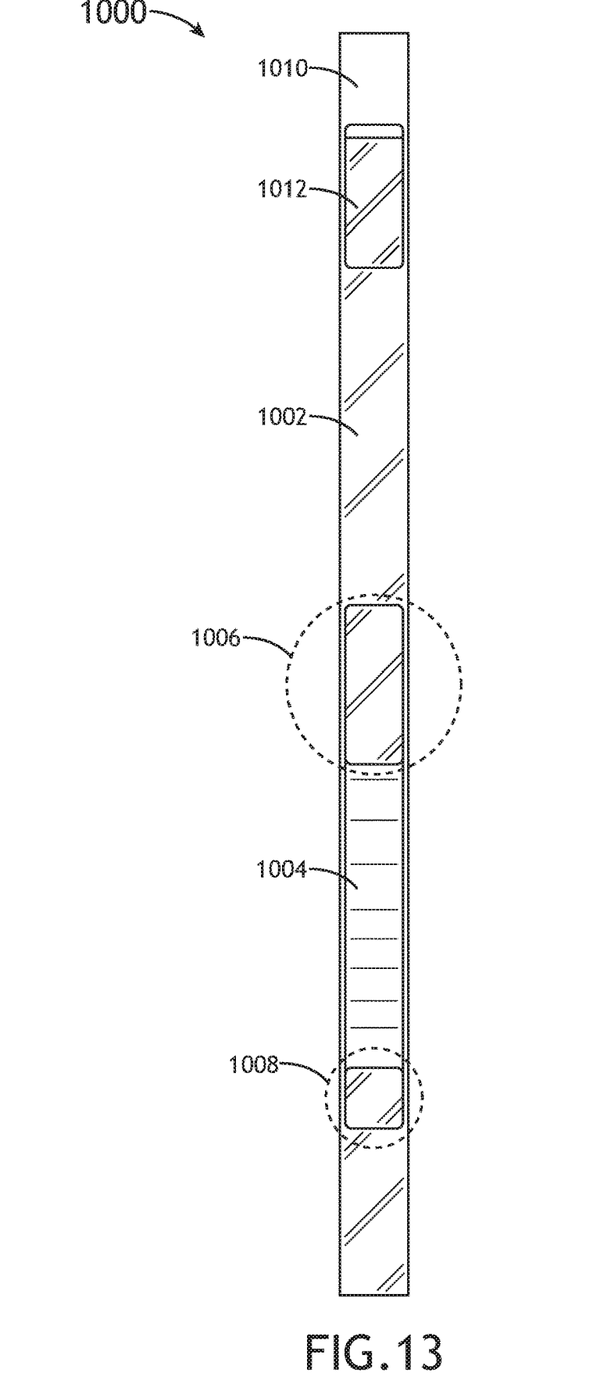
FIG. 13 shows a rear view of an exemplary embodiment of a combined illuminated handle and coat hook.

Referring to FIG. 13, a rear view of an exemplary embodiment of a combined illuminated handle and coat hook 1000 is shown. The structural portion 1002 and LED housing 1004 each have a generally constant width, but the LED handle housing 1004 and LED hook housing 1010 are narrower than the structural portion 1002. A narrower width of the LED housings 1004, 1010 may restrict the field of illumination to prevent the illuminated handle and coat hook 1000 from inadvertently, temporarily blinding a crew member.

Figure 14:
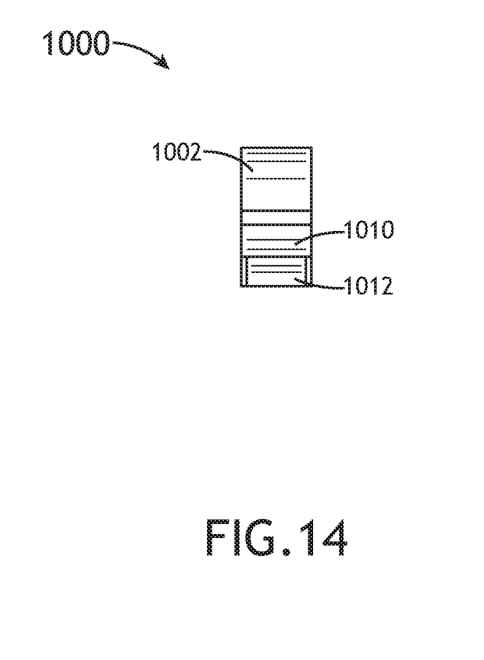
FIG. 14 shows a top view of an exemplary embodiment of a combined illuminated handle and coat hook.
Figure 15:
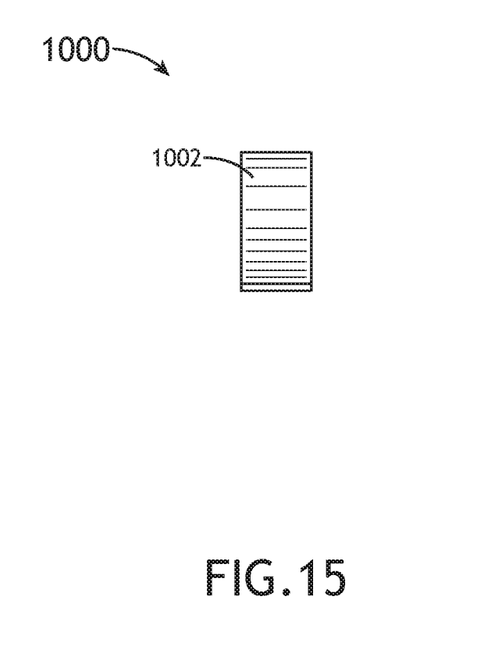
FIG. 15 shows a bottom view of an exemplary embodiment of a combined illuminated handle and coat hook.

Referring to FIGS. 14 and 15, a top view and bottom view of an exemplary embodiment of a combined illuminated handle and coat hook 1000 are shown.

Figure 16:
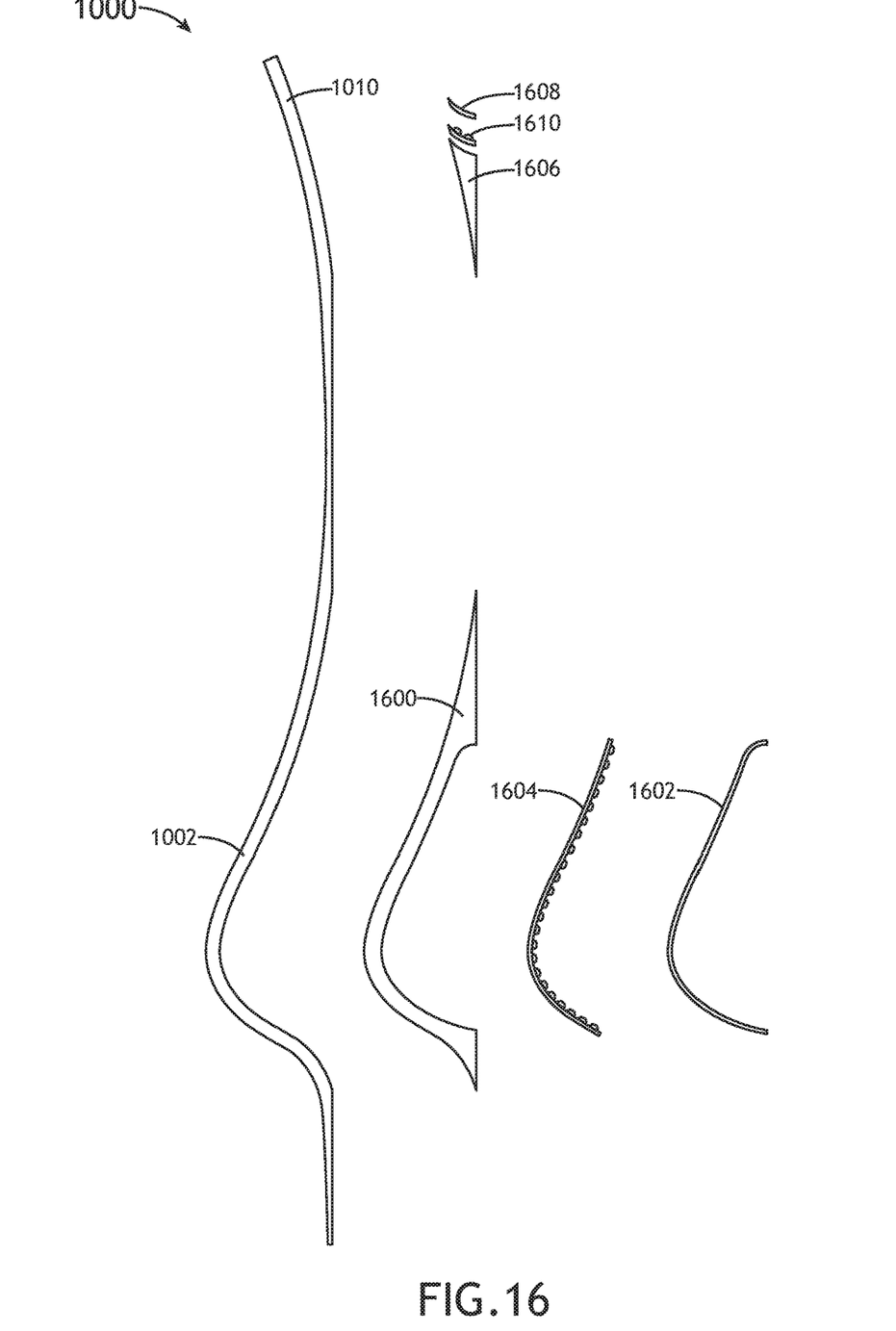
FIG. 16 shows an exploded view of an exemplary embodiment of a combined illuminated handle and coat hook.

Referring to FIG. 16, an exploded view of an exemplary embodiment of a combined illuminated handle and coat hook 1000 is shown. The illuminated handle and coat hook 1000 includes a structural portion 1002 that defines a handle and a hook portion 1010, an illumination handle portion, and illuminated coat hook portion. In at least one embodiment, the illuminated handle portion comprises an inner housing 1600, an outer housing 1602, and an LED component 1604. The inner housing 1600 generally conforms to the shape and size of the structural portion 1002 at the handle, and defines an opening to allow a user to grip the structural portion 1002. The outer housing 1602 allows access to the interior of the inner housing 1600 for installation and maintenance. In at least one embodiment, the outer housing 1602 may comprise a plate that snaps over an opening in the inner housing 1600.

Likewise, in at least one embodiment, the illuminated coat hook portion comprises an inner housing 1606, an outer housing 1608, and an LED component 1610. The inner housing 1606 generally conforms to the shape and size of the structural portion 1002 at the hook portion 1010. The outer housing 1608 allows access to the interior of the inner housing 1610 for installation and maintenance. In at least one embodiment, the outer housing 1608 may comprise a plate that snaps over an opening in the inner housing 1606.

In at least one embodiment, the LED components 1604, 1610 comprise LED strips configured to adhere to an interior surface of the structural portion 1002. Alternatively, or in addition, the LED components 1604, 1610 may comprise one or more individual LEDs. Individual LEDs may be disposed at top and bottom portions of the inner housing 1600 of the illuminated handle portion, and within the inner housing 1606 of the hook portion 1010.

The LED components 1604, 1610 are connected to a power supply which may be a switch to activate the LED components 1604, 1610; for example, when cabin lights are dimmed or when a nearby stowage compartment is opened. Furthermore, the LED component 1604 of the handle portion may be independently controllable from the LED component 1610 of the hook portion 1010.

Figure 17:
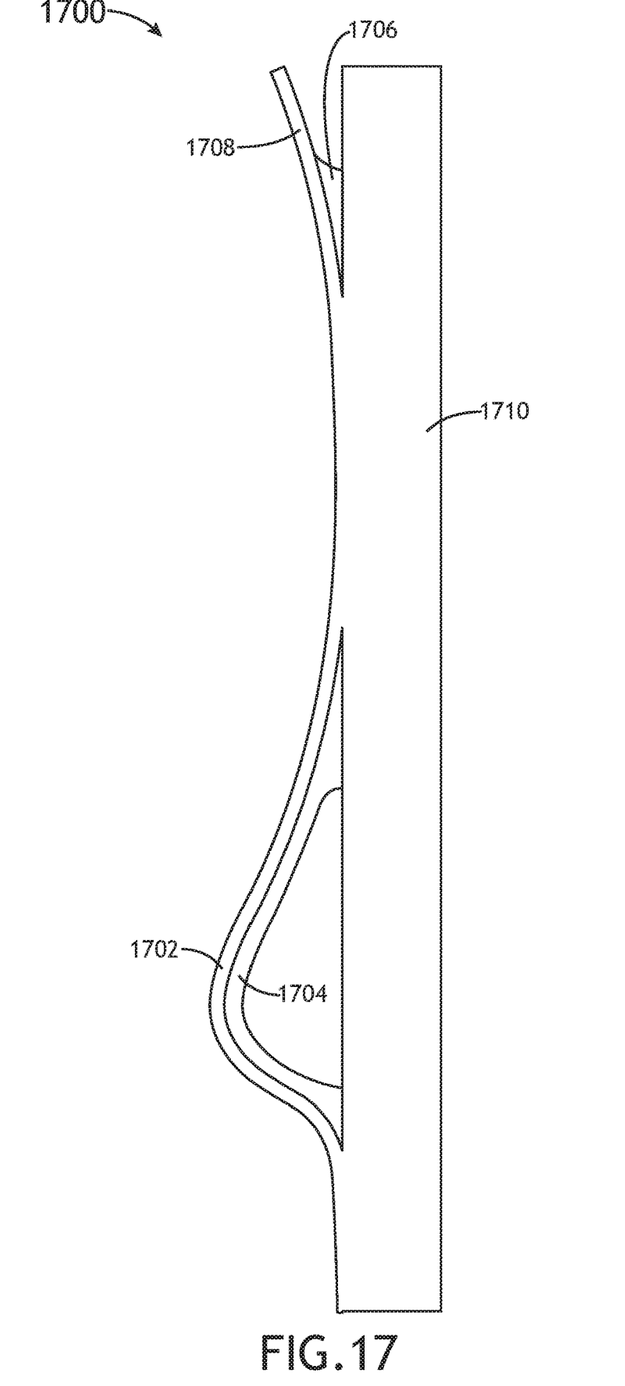
FIG. 17 shows a side view of an exemplary embodiment of a combined illuminated handle and coat hook.

Referring to FIG. 17, a side view of an exemplary embodiment of a combined illuminated handle and coat hook 1700 is shown. The illuminated handle and coat hook 1700 includes a structural portion 1702 that defines a handle portion and a hook portion 1708, an LED housing handle portion 1704, and an LED housing hook portion 1706. The structural portion 1702 may comprise a milled, stamped, or extruded element with structural characteristics sufficient to satisfy relevant Federal Aviation Administration requirements for passenger and crew area hand holds.

In at least one embodiment, the LED handle housing 1704 and LED hook housing 1706 each comprises a translucent cover to diffuse light from internal LEDs. The LED housings 1704, 1706 are disposed on an interior surface of the structural portion 1702, oriented to illuminate a corresponding section of stowage compartments.

The illuminated handle and coat hook 1700 comprises a bulkhead integration portion 1710 configured to surround a portion of a bulkhead to provide a secure connection for the handle portion. In at least one embodiment, the bulkhead integration portion 1710 and structural portion 1702 may be comprised of a single component.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An illuminated handle comprising:
   a structural portion; and
   an illuminated portion comprising:
      an LED housing; and
      an LED component,
   wherein:
      the structural portion is configured to be mounted on aircraft stowage compartment and comprises a bulkhead integration portion configured to surround a portion of a bulkhead; and
      the illuminated portion is disposed on an interior surface of the structural portion.

2. The illuminated handle of claim 1; wherein the LED component comprises an LED strip adhered to an interior surface of the structural portion.

3. The illuminated handle of claim 1; wherein the LED component comprises an LED disposed in a top portion of the LED housing and an LED disposed in a bottom portion of the LED housing.

4. The illuminated handle of claim 1; wherein the LED housing comprises:
   an inner housing disposed on an interior surface of the structural portion; and
   an outer housing configured to allow access to the LED component within the inner housing.

5. The illuminated handle of claim 4; wherein the outer housing comprises a plate configured to snap over an opening defined by the inner housing.

6. An illuminated handle and coat hook comprising:
a structural portion defining a handle portion and a hook portion; and
an illuminated handle portion comprising:
  an LED housing; and
  an LED component; and
an illuminated coat hook portion comprising:
  an LED housing; and
  an LED component,
wherein:
  the structural portion is configured to be mounted on aircraft stowage compartment and comprises a bulkhead integration portion configured to surround a portion of a bulkhead;
  the illuminated handle portion is disposed on an interior surface of the handle portion; and
  the illuminated coat hook portion is disposed on an interior surface of the hook portion.

7. The illuminated handle and coat hook of claim 6; wherein each LED component comprises an LED strip adhered to an interior surface of the structural portion.

8. The illuminated handle and coat hook of claim 6; wherein the LED component of the illuminated handle portion comprises an LED disposed in a top portion of the corresponding LED housing and an LED disposed in a bottom portion of the corresponding LED housing.

9. The illuminated handle and coat hook of claim 6; wherein the LED housing of the illuminated handle portion comprises:
  an inner housing disposed on an interior surface of the structural portion; and
  an outer housing configured to allow access to the LED component within the inner housing.

10. The illuminated handle and coat hook of claim 9; wherein the outer housing comprises a plate configured to snap over an opening defined by the inner housing.

11. An aircraft stowage system comprising:
an illuminated handle and coat hook comprising:
  a structural portion defining a handle portion and a hook portion; and
  an illuminated handle portion comprising:
    an LED housing; and
    an LED component; and
  an illuminated coat hook portion comprising:
    an LED housing; and
    an LED component,
  wherein:
    the structural portion is configured to be mounted on aircraft stowage compartment;
    the illuminated handle portion is disposed on an interior surface of the handle portion; and
    the illuminated coat hook portion is disposed on an interior surface of the hook portion.

12. The aircraft stowage system of claim 11; wherein each LED component comprises an LED strip adhered to an interior surface of the structural portion.

13. The aircraft stowage system of claim 11; wherein the LED component of the illuminated handle portion comprises an LED disposed in a top portion of the corresponding LED housing and an LED disposed in a bottom portion of the corresponding LED housing.

14. The aircraft stowage system of claim 11; wherein the LED housing of the illuminated handle portion comprises:
  an inner housing disposed on an interior surface of the structural portion; and
  an outer housing configured to allow access to the LED component within the inner housing.

15. The aircraft stowage system of claim 14; wherein the outer housing comprises a plate configured to snap over an opening defined by the inner housing.

16. The aircraft stowage system of claim 11;
wherein the structural portion further comprises a bulkhead integration portion configured to surround a portion of a bulkhead.

17. The aircraft stowage system of claim 11; wherein each LED component is connected to an aircraft power supply.

18. The aircraft stowage system of claim 17; further comprising a switch configured to illuminate each LED component when cabin lights are dimmed.

* * * * *